April 22, 1958     R. A. GAISER     2,831,792
LAMINATED GLASS
Filed Dec. 21, 1954
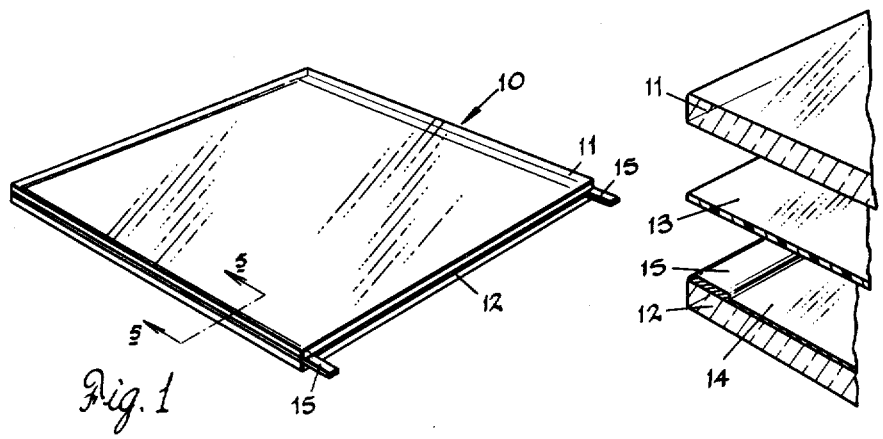
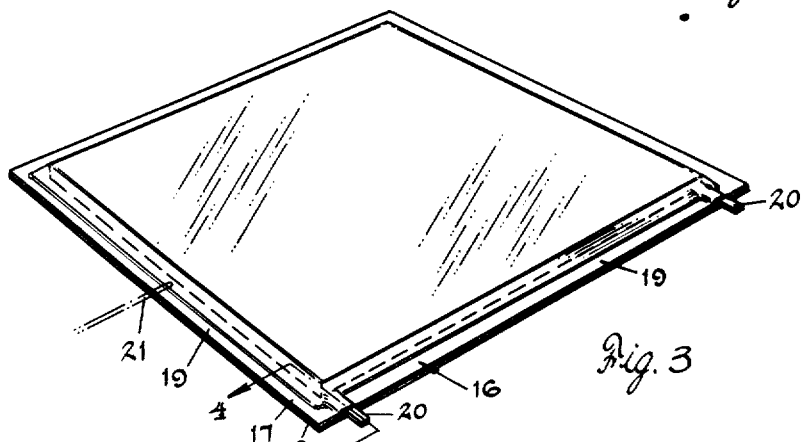
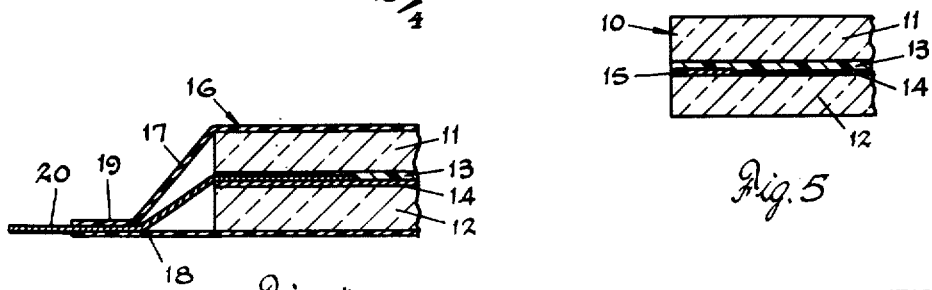
INVENTOR.
Romey A. Gaiser
BY
Nobbe & Swope
ATTORNEYS

United States Patent Office 2,831,792
Patented Apr. 22, 1958

2,831,792

LAMINATED GLASS

Romey A. Gaiser, Toledo, Ohio, assignor to Libbey-Owens-Ford Glass Company, Toledo, Ohio, a corporation of Ohio Application December 21, 1954, Serial No. 476,663

10 Claims. (Cl. 154—2.73)

The present invention relates to special laminated glass structures, and more particularly to an improved process and apparatus for forming laminated glass.

The type of laminated glass structure with which this invention is particularly concerned comprises two sheets of glass and an interposed layer of non-brittle plastic adherent thereto to provide a composite structure and in which a surface of at least one of the glass sheets is provided with a transparent electrically conductive film. Such laminated, electrically conducting structures have come to be widely used in preventing fogging and icing conditions on aircraft windows and other vehicles and heretofore have been formed by conventional laminating apparatus and techniques involving the application of external heat and pressure which of course require the use of large and expensive equipment.

Broadly stated, the present invention proposes to apply heat internally to heat the plastic to a laminating temperature preferably by means of an electrically conductive film which may be adhered to at least one of the glass sheets.

It is a primary object of this invention to provide a process of laminating glass which is relatively simple and inexpensive requiring a relatively small expenditure in laminating equipment.

Another object of the invention is to provide a process for laminating glass without the use of an external heat source.

A still further object of the invention is to provide a process of laminating glass which is neat and clean.

Other objects and advantages of the invention will become more apparent during the course of the following description when taken in connection with the accompanying drawings.

In the drawings wherein like numerals are employed to designate like parts throughout the same:

Fig. 1 is a perspective view of a laminated glass structure made according to the invention;

Fig. 2 is a fragmentary perspective view showing the relationship of the separated components of the laminated sandwich structure shown in Fig. 1;

Fig. 3 is a perspective view showing the laminating apparatus of the invention;

Fig. 4 is a fragmentary sectional view taken substantially along lines 4—4 of Fig. 3; and Fig. 5 is a partial sectional view taken along lines 5—5 of Fig. 1.

Referring now more particularly to the drawings, there is shown in Fig. 1 an electrically conducting laminated glass structure 10 of the general type quite commonly used in aircraft glazing. More particularly, as may be best seen in Fig. 2, the laminated sandwich structure comprises two sheets of glass 11 and 12, an interposed layer of non-brittle plastic 13, and an electrically conducting film 14 on the glass sheet 12 provided with suitable electrodes or bus bars 15. The plastic interlayer 13 is preferably formed formed of synthetic resinous material such as, for example, polyvinyl butyral. However, different plastics varying in thickness and physical characteristics may be employed and the invention is not limited to the use of any particular resin.

The transparent electrically conducting film 14 may be formed of tin oxide which may be applied in a number of different ways, as by the method described in Patent No. 2,429,420, granted October 21, 1947, to H. A. McMaster. Or, the film may be formed of a metal selected from the group consisting of gold, silver, copper, iron, and nickel as described in Patent No. 2,628,927, issued February 17, 1953, to William H. Colbert, Willard L. Morgan, and Arthur R. Weinrich. As noted above, and as may be seen in Figs. 1 and 2, the electrodes 15 extend along a pair of marginal edges of the sheet 12 in contact with the electrically conducting film 14. The electrodes may be of any one of a number of different materials which can be applied in any convenient manner. For example, electrodes of sprayed copper, sprayed copper alloy baked on gold, silver, and platinum fluxes and combinations of these metals have all been used satisfactorily.

In fabricating the laminated glass structure 10, the laminations may first be cut to the desired size and then assembled in sandwich form. Any suitable jig means or the like can be employed to position the plastic layer 13 between the glass sheets 11 and 12 with the filmed or coated surface 14 of the glass sheet 12 preferably facing inwardly and lying adjacent the interlayer 13. As thus assembled, there is present between the laminations undesirable air, moisture, and/or gas which must be removed in order that an efficient bond be obtained between the respective laminae. It is therefore desirable, although not necessary in all cases, to dry out the excess air and moisture by passing the assembly between one or more curved or semi-resilient pressing rollers before the sandwich is ready to be subjected to the heat and pressure required to bond the laminae together.

To accomplish this bonding effect, according to the present invention, the superimposed sheets 10 and 11 and plastic interlayer 13 are placed in a suitable plastic bag 16 such as shown in Fig. 3. The plastic bag 16 is formed of two sheets or layers of an air impervious plastic material 17 and 18 which are sealed together around their marginal edge portions as at 19. If desired, three sides of the sheets 17 and 18 may be sealed before the components of the laminated structure 10 are inserted therein, and after the glass has been placed in the bag thus formed, the fourth side may be sealed by a heating element or other suitable sealing means to complete the air tight sealing of the bag. As may be seen in Figs. 3 and 4, the seal is formed around the leads or extensions 20 which are suitably connected to the electrodes or bus bars 15 thus allowing them to extend outwardly of the bag for a purpose to be described hereinbelow.

After the plastic bag 16 has been sealed around its entire marginal periphery, the air remaining in the bag may be extracted by means of a suitable conduit or tube 21 connected to a vacuum source not shown. The vacuum tube is sealed between the marginal edges of the sheets 17 and 18 and extends into the interior of the bag adjacent the sealed marginal edge 19. By extracting the air within the bag, the laminae are subjected to a pressure by the atmosphere on the outside of the bag which further forces the air from between the laminae and also assures uniform even contact between the plastic interlayer 13 and the sheets 11 and 12.

In order to supply heat to the plastic interlayer 13, so as to allow it to form the bond between the respective sheets, power is supplied to the lectrodes 15 from an external source, not shown, through the leads 20 to heat the electrically conducting coating 14 to a temperature sufficient to raise the temperature of the interlayer 13 to a laminating temperature. This temperature is generally between 180° and 220° F., depending of course on the characteristics of the plastic used, although, it may in some instances be higher or lower. Of course, the length of time required to laminate the structure will depend on the lamination temperature of the plastic, the resistance and heating characteristics of the electrically conductive coating, and the power supplied to the coating.

Upon completing the laminating process, the power is turned off and the bag 16 may be removed from the laminated structure 10 and disposed of. Or, the bag may be cut along one edge and used for a subsequent operation where smaller sheets are to be laminated.

It will thus be evident that all of the head necessary to laminate the sheets together is supplied through the electrically conducting film 14 which eliminates the necessity for large external heating units. Furthermore, because of the very simple plastic bag that is used, large pressure units are not required and thus the laminated structure may be produced relatively inexpensively. While only two sheets of glass have been shown to be laminated, it of course is within the realm of the invention to produce laminated articles which are made up of three or more sheets.

It is also to be understood that the form of this invention disclosed herein is to be taken as the preferred embodiment thereof, and that various changes in the shape, size and arrangement of parts may be resorted to without departing from the spirit of the invention or the scope of the following claims.

I claim:

1. In a method of laminating glass sheets, the steps of arranging glass sheets and an interposed plastic layer in superimposed relation with respect to one another to produce a sandwich, and heating the contacting faces of the laminations to a greater temperature than the outside faces of the lamination by heat applied between at least one of said glass sheets and said plastic layer to heat the plastic layer to laminating temperature and thereby effect a bond between said glass sheets and said plastic layer.

2. In a method of laminating glass sheets, the steps of arranging at least one glass sheet and a plastic layer in superimposed relation with respect to one another to produce a sandwich, and heating the contacting faces of the lamination from a source of heat located inside the structure and between a glass sheet and said plastic layer to heat the plastic layer to laminating temperature to thereby effect a bond between said glass sheets and said plastic layer.

3. In a method of laminating glass sheets, the steps of arranging at least one glass sheet and a plastic layer in superimposed relation with respect to one another to produce a sandwich, and heating said plastic layer to laminating temperature by a heating element in direct contact with both a glass sheet and said plastic layer to effect a bond between said glass sheets and said plastic layer.

4. A method of forming a laminated structure of a plurality of laminae of sheet material with at least one of said sheets being of a plastic material, including the steps of arranging a plurality of said laminae in superimposed relation with respect to one another to form a sandwich, and heating said plastic material to a higher temperature than the outside faces of the lamination by heat applied to the inside and between one of said glass sheets and said plastic layer of said sandwich to laminate said sheets together.

5. In a method of forming a laminating structure of a plurality of laminae of sheet material with at least one of said sheets being of a plastic material, the steps of arranging the plurality of laminae in superimposed relation with respect to one another to form a sandwich, applying outside pressure to said sandwich to force air from between said laminae, and applying heat to said sandwich internally from a source of heat located between one of said glass sheets and said plastic layer to heat said plastic layer to laminating temperature to laminate said sheets together.

6. In a method of laminating sheet material with at least one of said sheets having an electrically conducting film thereon by an interposed layer of plastic material, the steps of arranging a plurality of said sheets and said plastic material in superimposed relation with respect to one another to form a sandwich with said electrically conducting coating on one of said sheets in contact with said plastic, and supplying power to said electrically conducting film to heat said plastic material to at least the laminating temperature thereof to cause said plastic layer to bond to said sheets.

7. In the method of laminating sheet material together by a layer of plastic material with at least one of said sheets having an electrically conducting film thereon, the steps of arranging said sheets and said plastic layer in superimposed relation with one another to form a sandwich, placing said sandwich in a plastic bag and sealing said sandwich in said bag, removing air from said bag, and heating said plastic layer by applying power to said electrically conducting film.

8. In the method of laminating sheet material together by a layer of plastic material with at least one of said sheets having an electrically conducting film thereon, the steps of arranging a plurality of said sheets in superimposed relation with respect to one another and with respect to a layer of said plastic material with said electrically conducting film on one of said sheets in contact with said plastic layer, removing the air from between said sheets and layers while said sandwich is in air tight container, and applying power to said electrically conducting film to heat said plastic layer to the laminating temperature thereof to cause said plastic layer to bond said sheets together.

9. A method of producing an electrically conducting laminated article which comprises applying an electrically conducting film to a surface of a sheet, assembling said sheet with a layer of plastic material in contact with said electrically conducting film, and supplying power to said electrically conducting film to heat said plastic material to at least the laminating temperature thereof to cause said plastic layer to bond to said sheet.

10. A method of producing electrically conducting laminated safety glass, the steps of applying a transparent electrically conducting film comprising essentially tin oxide to the surface of one of the glass sheets to be laminated, assembling said filmed sheet together with another glass sheet and an interposed layer of plastic, supplying power to said electrically conducting film while in said assembly to heat said plastic material and cause it to bond to said glass sheets.

References Cited in the file of this patent

UNITED STATES PATENTS

| | | |
|---|---|---|
| 2,372,929 | Blessing | Apr. 3, 1945 |
| 2,552,955 | Gaiser et al. | May 15, 1951 |